UNITED STATES PATENT OFFICE.

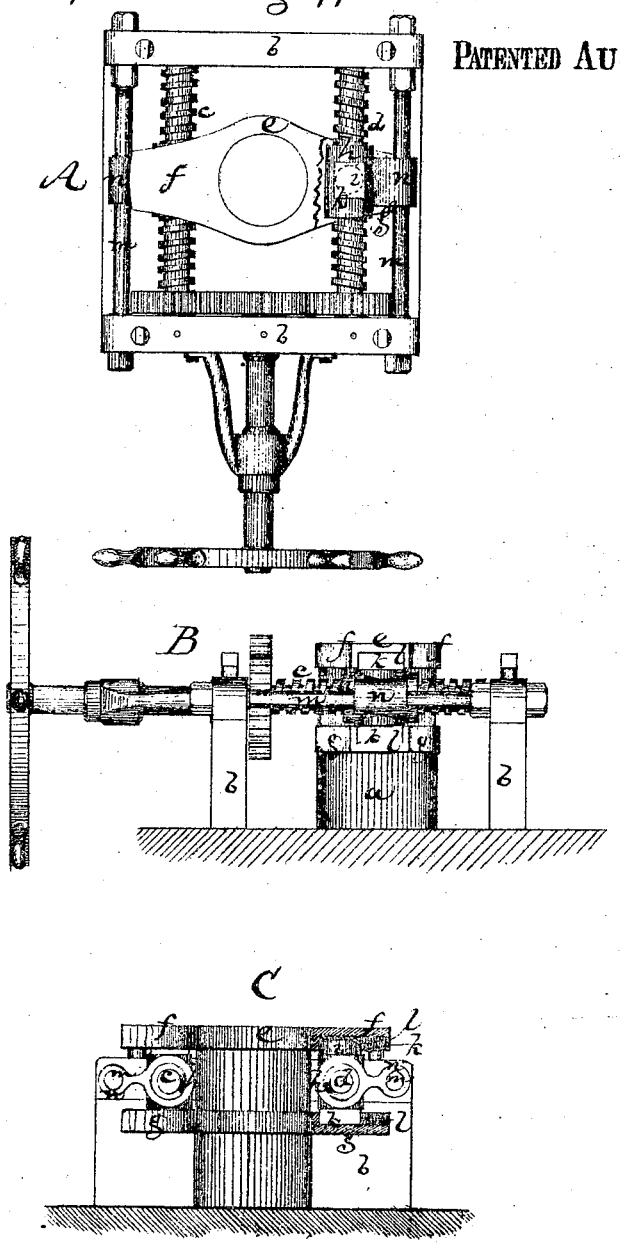

NATHAN RICHARDSON, OF GLOUCESTER, MASSACHUSETTS.

IMPROVEMENT IN STEERING APPARATUS.

Specification forming part of Letters Patent No. 117,929, dated August 8, 1871.

*To all whom it may concern:*

Be it known that I, NATHAN RICHARDSON, of Gloucester, in the county of Essex and State of Massachusetts, have invented an Improved Steering Apparatus; and I do hereby declare that the following, taken in connection with the drawing which accompanies and forms part of this specification, is a description of my invention, sufficient to enable those skilled in the art to practice it.

My invention relates to that class of steering apparatus one instance of which may be seen in United States Letters Patent No. 19,813, or apparatus in which tiller-arms projecting from opposite sides of the rudder-head are worked by simultaneously-operated right-and-left-hand screw-shafts, each shaft having a traversing nut connected with the adjacent tiller-arm, and the two shafts carrying gears with which the opposite sides of a center driving-gear engages, the center gear being on the steering-wheel shaft. My invention relates to the details of construction and arrangement of the mechanism of such an apparatus; and consists in connecting the tiller-arms and screw-shafts by nuts, each of which has on its outer side, in a horizontal plane with its axis, a sleeve sliding upon an adjacent connecting-rod, and directly over and under it two swiveling-runners or slides running in grooves in the tiller-arms, each tiller-arm being bifurcated and having in each member a groove in which one of said slides works. It is in this specific construction that my improvement consists. Under all previous constructions of steering apparatus having the general organization shown in my invention, as well as in the aforementioned patent, the connections of the screw-shafts with the rudder have been such that severe strain upon them would seriously impair their effective operation, the nuts binding and failing to ride easily upon the screws. But by my arrangement the strain upon all sides of the nuts is so equalized that they are always kept in proper operative position, and therefore always ride freely and easily upon their shafts, enabling the rudder to be always readily turned by the steering-wheel, and to the extreme point of movement of the rudder in either direction.

The drawing represents a steering apparatus embodying the invention. A shows the apparatus in plan, one tiller-arm being broken away to show the mechanism beneath it. B is a side elevation of the apparatus. C is a sectional elevation.

$a$ denotes the rudder-head projecting up between standards $b$, in which are journaled the opposite ends of the two parallel right-and-left-hand screw-shafts $c\,d$. Upon the top of the rudder-head is fixed a collar or encompassing ring, $e$, from the top and bottom and on opposite sides of which project arms $f\,g$, each pair of arms extending, respectively, over and under the screw-shaft, on the same side of the rudder-head. On each screw-shaft is a tubular nut or nut-threaded sleeve, $h$, and from the top and bottom of each nut projects a pin, $i$, upon which swivels a runner, $k$, that fits and slides in a groove, $l$, in the adjacent upper or under surface of the tiller-arm $f$ or $g$. The two vertical journal-stands of the frame are connected by rods $m\,m$, which are in a horizontal plane with the axes of the screw-shafts, and sliding upon each of these rods is a sleeve, $n$, which forms part of the adjacent nut. It will thus be observed that each nut is connected with the tiller-arm, both above and below the screw-shaft on which it works, in a vertical plane with the axis of the screw, and is also sustained at its side by sliding upon a guide-rod, the relative movement of all parts being thus effected without undue or injurious strain upon any of the mechanism to impair the action thereof.

I claim—

A steering apparatus in which the tiller-arms $f\,g$ on each side of the rudder-head are connected to the screw-shafts and operated by nuts $h$, each nut having a swiveled runner, $k$, both over it and under it, (said runners working in grooves in the tiller-arms,) and having also a lateral sleeve, $n$, sliding in the rod $m$, substantially as shown and described.

N. RICHARDSON.

Witnesses:
FRANCIS GOULD,
S. B. KIDDER.